United States Patent [19]

Hart

[11] Patent Number: 4,852,342
[45] Date of Patent: Aug. 1, 1989

[54] CABLE HANDLING CHAIN

[75] Inventor: Anthony J. Hart, Arnold, United Kingdom

[73] Assignee: Mansign Engineering Limited, United Kingdom

[21] Appl. No.: 104,958

[22] Filed: Oct. 6, 1987

[30] Foreign Application Priority Data

Jul. 1, 1987 [GB] United Kingdom ............... 8715478

[51] Int. Cl.[4] ........................................... F16G 13/16
[52] U.S. Cl. ...................................... 59/78.1; 248/49; 248/51
[58] Field of Search ................ 59/78, 78.1; 248/49, 248/51, 68 R

[56] References Cited

U.S. PATENT DOCUMENTS

| 3,192,704 | 7/1965 | Macrae | 59/78.1 |
| 3,848,407 | 11/1974 | Moritz | 59/78.1 |
| 4,006,875 | 2/1977 | Smith et al. | 59/78.1 |
| 4,499,720 | 2/1985 | Klein | 59/78.1 |

FOREIGN PATENT DOCUMENTS

| 1267918 | 5/1968 | Fed. Rep. of Germany | 59/78.1 |
| 2020107 | 4/1971 | Fed. Rep. of Germany | 59/78.1 |
| 1441362 | 6/1976 | United Kingdom | 59/78.1 |
| 1442614 | 7/1976 | United Kingdom | 59/78.1 |
| 2111634 | 7/1983 | United Kingdom | 59/78.1 |

Primary Examiner—David Jones
Attorney, Agent, or Firm—Jones, Askew & Lunsford

[57] ABSTRACT

A cable/hose handling chain having a plurality of hingedly connected chain links, each chain link including a transmission link assembly hingedly connected to adjacent transmission link assemblies to form said chain. Each chain link includes a cable/hose attachment for attaching cables/hoses thereto, the transmission link assembly for each alternate chain link having a pair of side by side plate members, and for each chain link located between the alternative chain links having at least one plate member. The plate members for said alternate chain links are arranged so as to be spaced apart to define a gap to accommodate the plate member(s) of the chain links located between said alternate chain links.

13 Claims, 6 Drawing Sheets

CABLE HANDLING CHAIN

The present invention relates to a cable/hose handling chain.

In certain working environments, such as a coal mine, machinery have cables and hoses connected to them for supplying electricity, hydraulic fluid, coolant fluids, etc. It is desirable for these cables and hoses to be retained in an ordered fashion and also to be protected from damage by snagging or rubbing against obstacles. It is known to retain cables and hoses within cable/hose handling chains and the present invention is concerned with an improved construction of such a chain.

According to one aspect of the present invention there is provided a cable/hose handling chain comprising a plurality of hingedly connected chain links, each chain link including a transmission link assembly hingedly connected to adjacent transmission link assemblies to form said chain, each chain link including cable/hose attachment means for attaching cables/hoses thereto, the transmission link assembly for each alternate chain link comprising a pair of side by side plate members, and for each chain link located between the alternate chain links comprising at least one plate member, the plate members for said alternate chain links being arranged so as to be spaced apart to define a gap to accommodate the plate member(s) of the chain links located between said alternate chain links.

According to another aspect of the invention there is provided a cable/hose handling chain comprising a plurality of hingedly connected chain links, each chain link including a transmission link assembly hingedly connected to adjacent transmission link assemblies to form said chain, each chain link including a pair of attachment members for attaching cables or hoses to the transmission link assembly, each attachment member comprising a body formed by a unitary plastics moulding having an upper wall portion connected to a lower wall portion by an end wall portion to define a compartment for the reception of cables or hoses.

Reference is made to the accompanying drawings in which,

FIG. 1 in a schematic view of a pair of chain links according to the present invention connected to one another;

Figure 3:
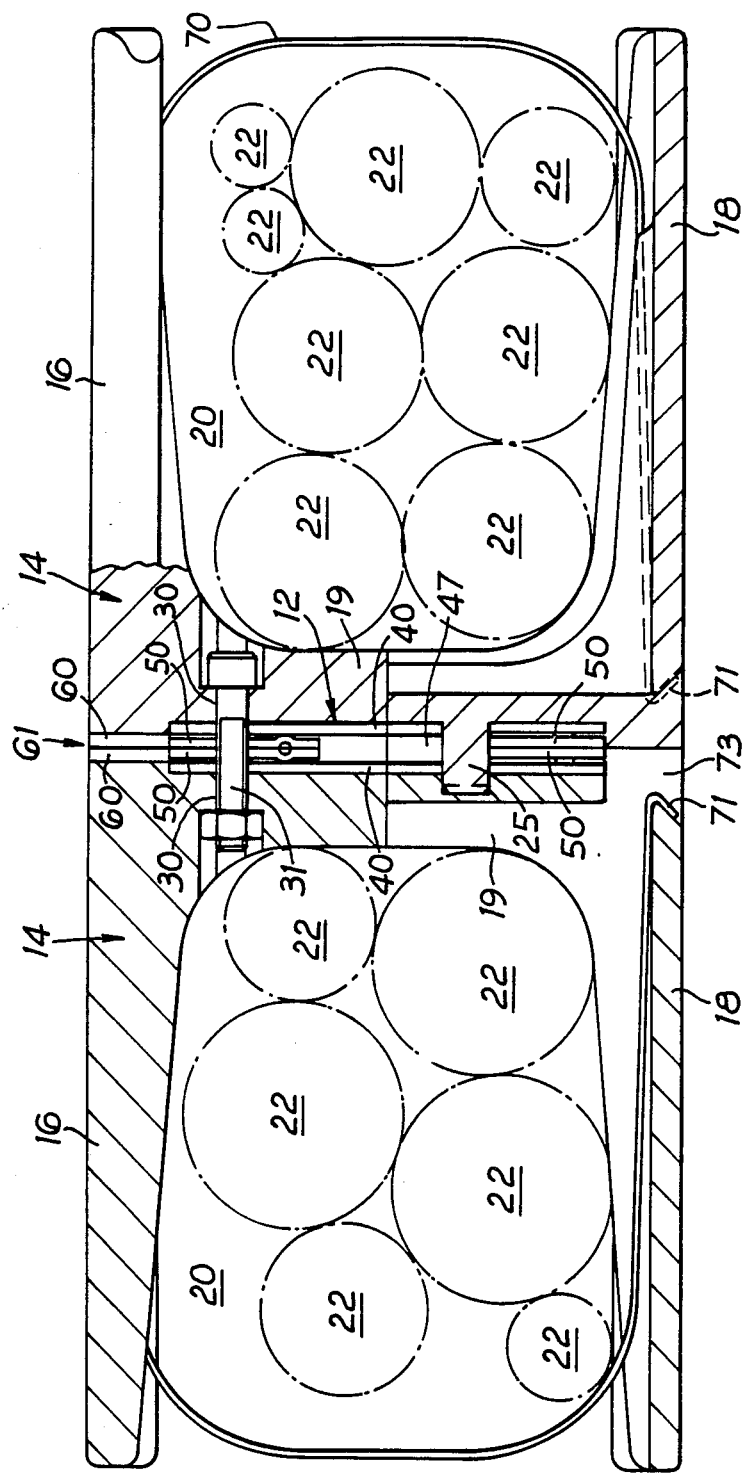
FIG. 3 is a sectional view taken along line III—III in FIG. 1.
Figure 4:
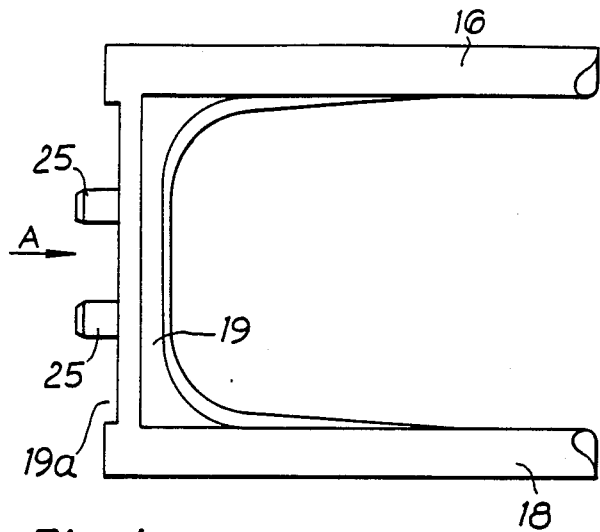
FIG. 4 is a side view of a cable/hose attachment member.

A chain link 10 as shown in the drawings comprises a transmission link assembly 12 to which a pair of cable/hose attachment members 14 are secured. In the illustrated embodiment each attachment member 14 is indentical and comprises a body formed by a unitary plastics moulding which includes an upper wall portion 16 connected to a lower wall portion 18 by an end wall portion 19. Accordingly, as seen in FIGS. 3 and 4 each attachment member 14 is generally U-shaped and thereby defines a cavity 20 for the reception of flexible hoses or cables 22.

The outer face of the end wall portion 19 is provided with a pair of projections 25 and a pair of recesses 26. The projections 25 and recesses 26 are symmetrically arranged so that a pair of attachment members 14 may be arranged back as seen in FIG. 3 with the projections 25 of one member 14 received in the recesses 26 of the other member.

In this way a pair of back to back attachment members are positively located and accurately positioned relative to one another such that their respective upper wall portions 16 and lower wall portions 18 are contiguous. A pair of through bores 30 are provided through which bolts 31 pass for fixedly securing the members 14 together.

The outer face of the end wall portion 19 of the body is recessed to define a channel 19a for the reception of the associated transmission link assembly 12 to which the members 14 are attached. The transmission link assembly 12 for each link 10 includes a pair of link plate members 40 which are located side by side. As seenm in FIG. 7, the link plate members 40 are preferably stamped from a metal strip and include apertures 42, 43 through which the projections 25 and bolts 31 respectively pass. The apertures 42 are preferably a close tolerance fit with the projections 25 so as to accurately position the link assembly and members 14 relative to one another during assembly. The assembly is then fixedly secured together by means of bolts 31.

The plate members 40 project laterally beyond each member 14 to define connection portions 48 for hinge connection to adjacent links 10. The connection portions 48 of adjacent links 10 are hingedly connected by means of a stub bolt 44 which passes through aligned apertures 46 formed in the connection portions 48.

Figure 7:
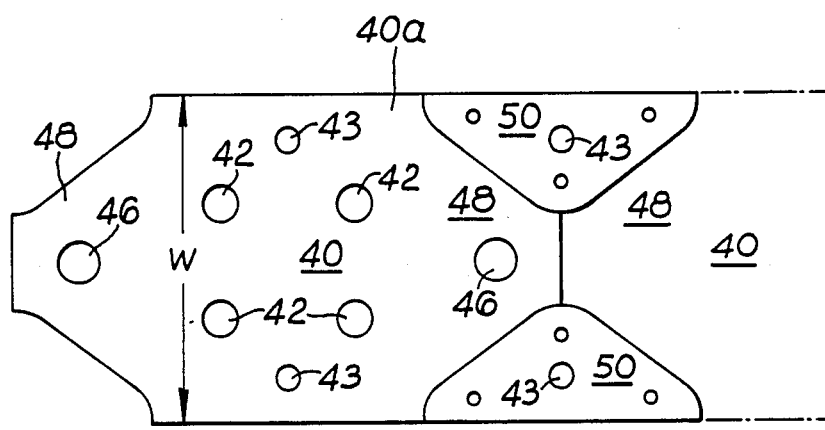
FIG. 7 is a side view of a metal strip from which component parts of the transmission link assembly are formed.

Each member 40 has a main body portion 40a having a width W from which the connection portions 48 project. As seen in FIG. 7 the width of the body portion 40a is the same as the width of the metal strip. The portion of the metal strip between the connection portions and the side edge of the strip defines the shape of the spacing members 50. Thus during the stamping procedure the plate members and spacing members are simultaneously produced.

Accordingly, in the assembled chain tensile forces applied to the chain, for instance by pulling of the chain, are transmitted through the connected transmission link assemblies and in addition the attachment bodies are isolated from such force.

Figure 1:
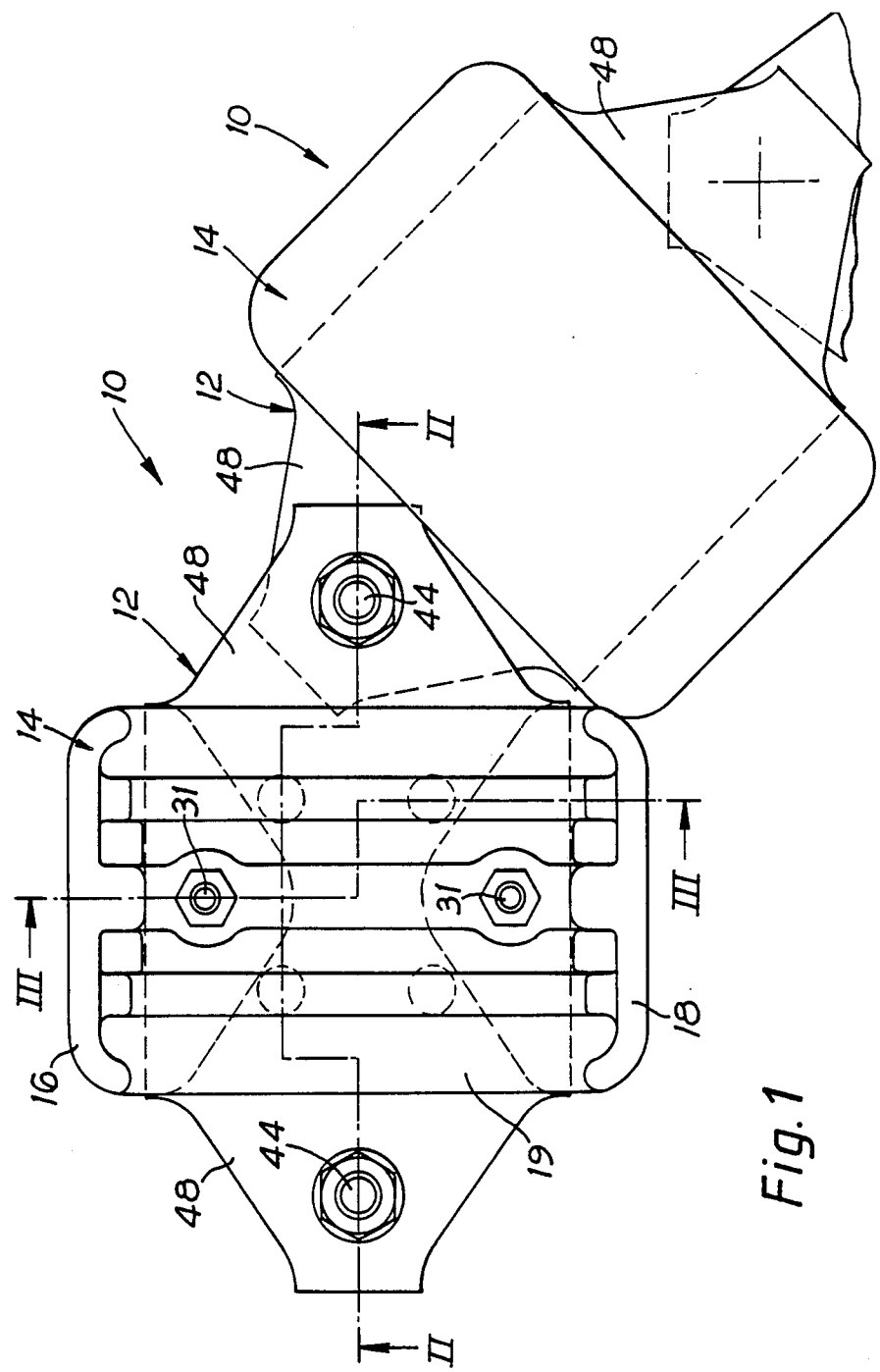
Figure 2:
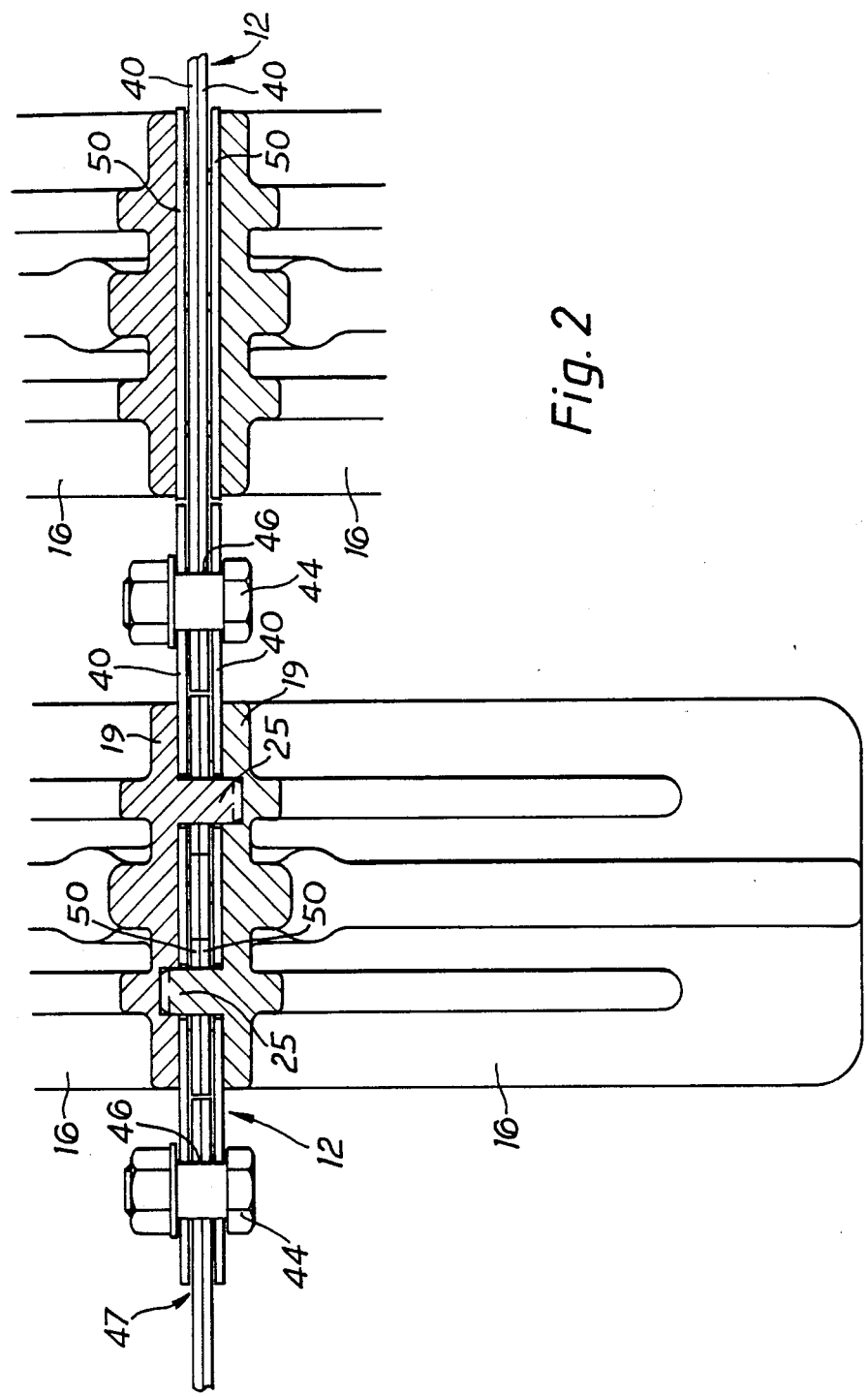
FIG. 2 is a sectional view taken along line II—II in FIG. 1.

As indicated in FIG. 2, the plate members 40 of one link 10 are arranged to be spaced apart to define a gap 47 for the reception of the plate members 40 of the adjacent link which are arranged in face to face contact. Spacing of plate members 40 to define a gap 47 is achieved using spacing members 50 which are conveniently formed from the same metal strip as the plate members 40 as illustrated in FIG. 7. A pair of spacing members 50 are provided for each plate member 40 and these are positioned as illustrated in FIGS. 1 to 3.

Accordingly, for one link 10 the spacing members 50 are located between the plate members 40 to thereby space them apart. For the adjacent link the plate members 40 are arranged in face to face contact with the spacing members located on the outside of the plate members. In this way each transmission link assembly for each link 10 is of the same overall width since it includes the same component parts. Accordingly it is possible with the use of three basic components viz. member 14, plate 40 and spacing member 50 to construct each link 10.

In order to form gap 47 so as to be larger than the combined thickness of the plate members 40 which are in face to face contact the spacing members 50 are provided with a series of projections 50a.

The projections 50a are conveniently formed during the stamping process. By varying the height of projections 50a it is possible to vary the amount of clearance between the plate members 40 in face to face contact and the spaced apart plate members 40 defining the gap. It will be appreciated that projections similar to projections 50a may be formed on one side of each plate member in addition to or instead of projections 50a for achieving the same effect.

It will be appreciated however that the transmission link assemblies for neighbouring links may comprise a different number of components. For instance alternate links require at least 2 plate members spaced apart to define the gap 47 to receive the plate members of the links located between those adjacent links. However one or more plate members may be provided for each of the links located between said adjacent links.

The outer face of the end wall portion 19 is preferably also provided with a groove 60 such that in the assembled link 10 a bore 61 is defined. This enables selected spacing members 50 to be provided with a suspension formation (such as a hook member) which passes through the bore 61 to be received on to a support such as an overhead rail (not shown). In this way the chain composed of links 10 may be easily modified to be supported from an overhead rail Cables and/or hoses are preferably retained within each member 14 by means of removable U-shaped resilient clips 70. Each clip 70 is provided with terminal hook formations 71 for engagement in opposed pairs of pockets 73 formed in the upper and lower wall portions 16 and 18 respectively.

Figure 5:
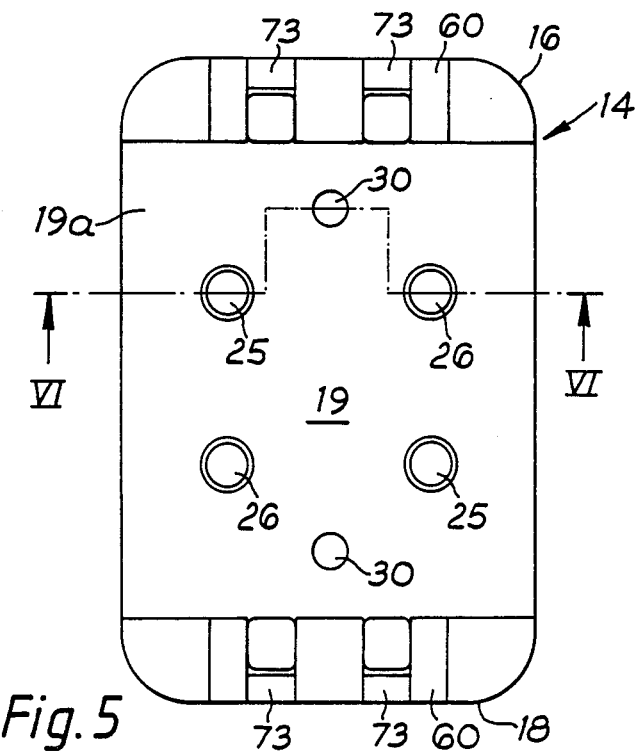
FIG. 5 is an end view of the attachment member of FIG. 4 as viewed along arrow A in FIG. 4.
Figure 6:
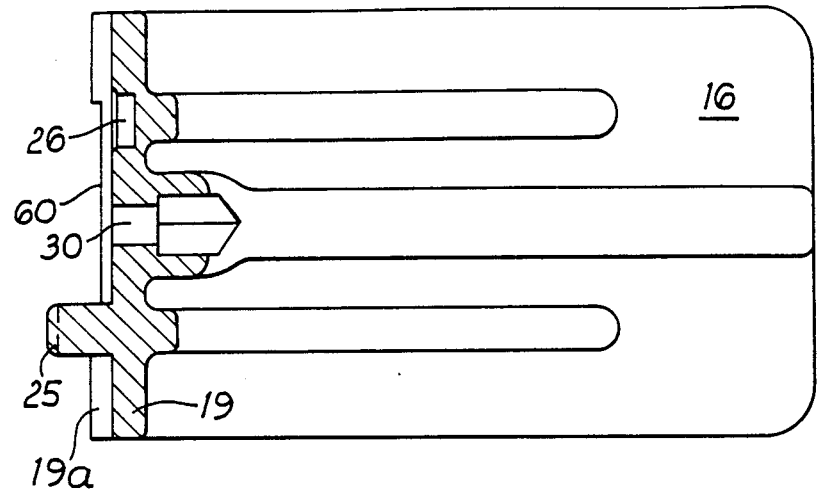
FIG. 6 is a sectional view of the attachment member taken along line VI—VI in FIG. 5.

As seen in FIG. 5, each member 14 is provided with two pairs of pockets 73 to enable two clips 70 to be used per member 14. It will be appreciated that each member 14 may be provided with a desired number of pairs of pockets 73 so as to be capable of accommodating one or more clips 70. The number of pairs of pockets 73 provided largely depends upon the size of the member 14 and the number and size of the cables/hoses which are to be received within the body.

Figure 8:
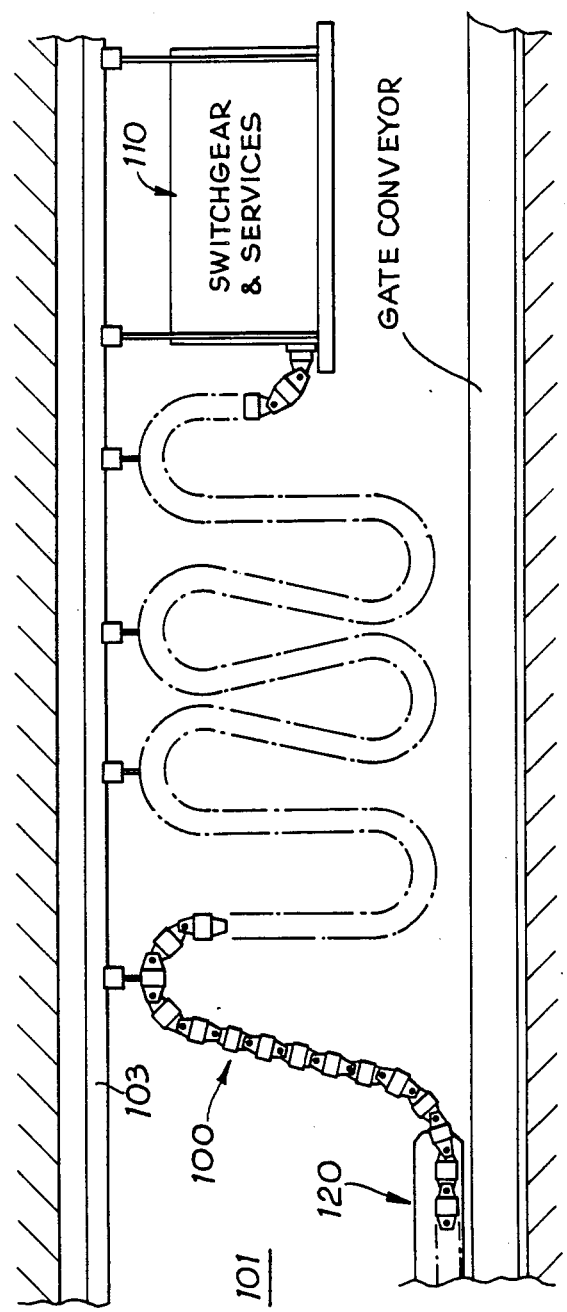
FIG. 8 is an illustration of a chain according to the present invention shown in use.

A typical installation using the chain of the present invention is illustrated in FIG. 8. The chain 100 made up of chain links 10 is shown located in the roadway 101 of a mine. The chain 100 is suspended in festoons from an overhead rail 103 and extends between a power/fluid supply 110 to machinery 120.

I claim:

1. A cable/hose handling chain comprising:
a plurality of hingedly connected chain links;
each chain link including a transmission link assembly hingedly connected to adjacent transmission link assemblies to form said chain;
each chain link including cable/hose attachment means for attaching cables/hose thereto;
the transmission link assembly for each alternate chain link comprising a pair of side by side plate members and, for each chain link located between the alternative chain links, comprising at least one plate member;
the plate members for said alternate chain links being arranged so as to be spaced apart to define a gap to accommodate the plate member(s) of the chain links located between said alternate chain links;
the transmission link assembly for each chain link located between said alternate chain links including a pair of plate members in face to face contact;
the plate members for all the chain links being identical and formed from a metal strip; and
for said alternate chain links, the plate members being spaced apart by at least one spacing member.

2. A chain according to claim 1 wherein each spacing member is formed simultaneously with the plate members from said metal strip.

3. A chain according to claim 2 wherein each plate member includes a main body portion having a width equal to the width of said metal strip and has a projection extending longitudinally from each longitudinal end to define a connection portion, each connection portion being of reduced width relative to the width of the metal strip, the spacing members being formed by that portion of the strip located between the connection portions of adjacent plate members and the side edge of the strip.

4. A chain according to claim 1 wherein the spacing members or the plate members, or both are provided with a series of laterally extending projections on one side face thereof such that said pair of plate members defining said gap can be spaced apart by a distance in excess of the combined thickness of the plate member(s) received within said gap.

5. A chain according to claim 1 wherein the attachment means for each link comprises an attachment member secured to one side of the transmission link assembly so as to project laterally therefrom, the attachment member defining a compartment for the reception of cables or hoses.

6. A chain according to claim 5 wherein the attachment member comprises a body formed by a unitary plastics moulding having an upper wall portion connected to a lower wall portion by an end wall portion, the end wall portion being attached to the transmission link assembly of the chain link.

7. A chain according to claim 6 wherein for each chain link a pair of said attachment bodies are provided and are arranged such that their respective end wall portions are located side by side with the transmission link assembly located therebetween.

8. A chain according to claim 6 wherein each attachment body is secured to its transmission link assembly by detachable fixing means.

9. A chain according to claim 8 wherein the detachable fixing means comprises one or more bolts.

10. A cable/hose handling chain comprising:
a plurality of hingedly connected chain links;
each chain link including a transmission link assembly hingedly connected to adjacent transmission link assemblies to form said chain;
each chain link including a pair of separate attachment members for attaching cables or hoses to the transmission link assembly;
each attachment member of each pair comprising a body formed by a unitary plastic molding having an upper wall portion connected to a lower wall portion by an end wall portion to define a compartment for the reception of cables or hoses;

the attachment members of each pair being positioned with their respective upper wall portions and lower wall portions contiguous with on another, and with their respective end wall portions side by side with the transmission link located therebetween;

the end wall portion of one body being provided with location means for cooperation with location means on the end wall portion of the adjacent body;

the location means comprising laterally extending projections and recesses for accommodating the projections of the adjacent body; and fixing means passing through the side by side end wall portions for fixing the attachment members to one another.

11. A cable/hose handling chain according to claim 10, wherein:

the transmission link assembly for each alternate chain link comprises a pair of side by side plate members, and each chain link located between the alternate chain links comprises at least one plate member; and the plate members for said alternate chain links being arranged so as to be spaced apart to define a gap to accommodate the plate member or plate members of the chain links located between said alternate chain links.

12. A cable/hose handling chain according to claim 11 wherein:

the plate members of each transmission link assembly are provided with apertures to enable the projections to pass therethrough; and said apertures and projections cooperate to positively locate each body relative to the link transmission assembly.

13. A cable/hose handling chain comprising:

a plurality of hingedly connected chain links;

each chain link including a transmission link assembly hingedly connected to adjacent transmission link assemblies to form said chain;

the transmission link assembly for each alternate chain link comprising a pair of side by side plate members, and each chain link located between the alternate chain links comprising at least one plate member;

the plate members for said alternate chain links being arranged so as to be spaced apart to define a gap to accommodate the plate member or plate members of the chain links located between said alternate chain links;

the plate members of each transmission link assembly being provided with apertures to enable the projections to pass therethrough;

said apertures and projections cooperating to positively locate each body relative to the link transmission assembly;

each chain link including a pair of attachment members for attaching cables or hoses to the transmission link assembly;

each attachment member of each pair comprising a body formed by a unitary plastic molding having an upper wall portion connected to a lower wall portion by an end wall portion to define a compartment for the reception of cables or hoses;

for each pair of attachment members, the end wall portion of one body is provided with location means for cooperation with location means on the end wall portion of the adjacent body;

the locations means comprising laterally extending projections and recesses for accommodating the projections of the adjacent body; and the attachment members of each pair being positioned with their respective upper wall portions and lower wall portions contiguous with one another, and with their respective end wall portions side by side with the transmission link located therebetween.

* * * * *